United States Patent

Pritchard, Jr. et al.

[15] 3,673,071

[45] June 27, 1972

[54] PROCESS FOR PREPARATION OF TUNNELING BARRIERS

[72] Inventors: John P. Pritchard, Jr., Richardson; Walter H. Schroen, Dallas, both of Tex.

[73] Assignee: Texas Instruments Incorporated, Dallas, Tex.

[22] Filed: Aug. 8, 1968

[21] Appl. No.: 751,229

[52] U.S. Cl. ..............................204/192, 117/212, 317/234

[51] Int. Cl. .......................................................C23c 15/00

[58] Field of Search .............204/192; 117/106, 212; 118/49

[56] References Cited

UNITED STATES PATENTS

| | | | |
|---|---|---|---|
| 3,522,492 | 8/1970 | Pierce | 317/234 |
| 3,451,912 | 6/1969 | O'Heurle et al. | 204/192 |
| 3,402,073 | 9/1968 | Pierce et al. | 117/212 |
| 3,394,066 | 7/1968 | Miles | 204/192 |
| 3,108,900 | 11/1963 | Papp | 204/192 |
| 3,021,271 | 2/1962 | Wehner | 204/192 |

*Primary Examiner*—John H. Mack
*Assistant Examiner*—Sidney S. Kanter
*Attorney*—Samuel M. Mims, Jr., James O. Dixon, Andrew M. Hassell, Harold Levine, James C. Fails, Melvin Sharp and Richards, Harris & Hubbard

[57] ABSTRACT

Tunneling barriers, in particular superconductive tunneling barriers (Josephson barriers), are prepared in a vacuum chamber maintained at a low atmospheric pressure using an oxygen glow discharge which produces stable and reproducible superconductive tunneling devices. To prepare a Pb—$Pb_xO_y$—Pb barrier the first lead film is placed in a vacuum chamber and charged to a negative potential with regard to the positive ions by fast electrons from the plasma charge. Oxygen gas molecules bombard the first lead film where they probably disassociate into two oxygen atoms. A surface reaction takes place which produces a lead-oxide insulating layer in the first lead film. After this lead-oxide layer has reached a predetermined thickness, the plasma is extinguished and the oxygen-lead reaction stops. Immediately after the oxide formation, a second lead layer is evaporated onto the oxide layer to form a tunneling barrier of the Josephson type. Instead of forming a lead-oxide insulating layer into the first lead film, polymerized organic molecules may be formed on the lead surface by the high energy bombardment.

10 Claims, 11 Drawing Figures

Figure 1:
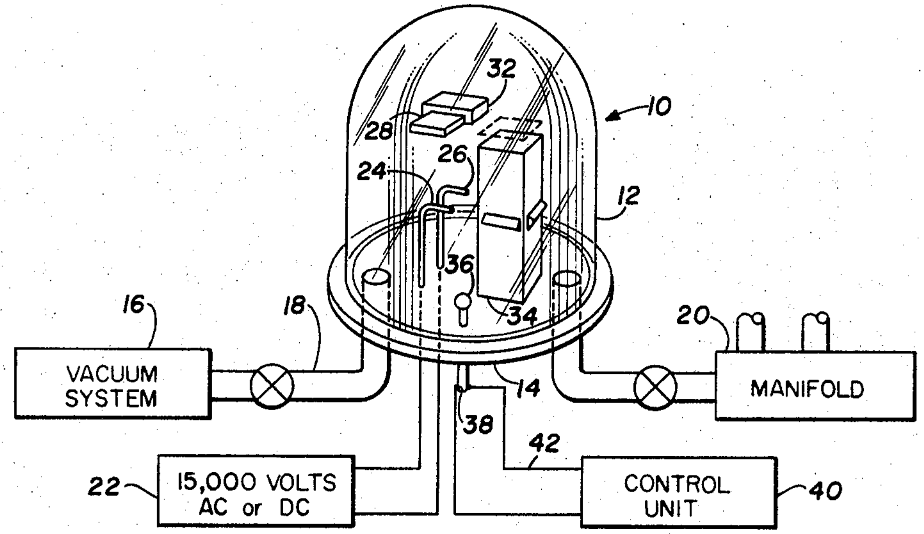

INVENTOR
JOHN P. PRITCHARD, JR.
WALTER H. SCHROEN
Harold E. Meier
ATTORNEY

PROCESS FOR PREPARATION OF TUNNELING BARRIERS

This invention relates to tunneling barrier fabrication, and more particularly to a glow discharge process for fabricating superconductive tunneling barriers which are stable and reproducible.

In 1962, in a paper entitled "Possible New Effects in Superconductive Tunneling", pages 251 to 253 of the July 1, 1962 issue of Physics Letters, B. D. Josephson described the phenomena of supercurrent tunneling through a barrier separating two superconductors. In addition, Josephson predicted oscillating currents, accompanied by photon emission, would be generated when a potential difference is sustained between the two sides of a barrier. Other investigators, such as B. W. Anderson and J. F. Rowell, observed and characterized the d. c. Josephson effect. Oscillating currents, commonly known as the a.c. effect, were first observed by I. K. Yanson et al in 1965, although much indirect experimental support had established the existence of such currents prior to this date. Parallel to these experimental efforts, theoretical investigations elucidated both the d. c. and a. c. phenomena. Devices that operate on superconductive tunneling through insulating layers are called "superconductive tunneling devices" (STDs).

Heretofore, superconductive tunneling devices were usually fabricated by exposure of the first metal film to room ambient or to humidity and pressure-controlled oxygen atmospheres for oxide formation. Such oxidation techniques use a diffusion process which, at room temperature, proceeds slowly to a depth of a few monolayers in a period of about thirty minutes. The oxide concentration decreases rapidly with distance from the surface. Several oxygen molecules may also penetrate the lattice and remain there in substitutional or interstitial places. However, a large number of $O_2$ molecules will remain adsorbed on the surface (approximately $10^{15}/cm^2$), ready to continue the diffusion into or reaction with a second lead layer evaporated after the oxidation process. The only requirement needed for a continuation of the $O_2$ diffusion or the oxide formation is thermal energy. Sufficient thermal energy to continue the $O_2$ diffusion or oxide formation may be produced by room temperatures. Thus, thin oxide layers produced in this manner tend to deteriorate during storage at room temperatures at periods of only several days.

Although stability of the tunneling barrier is of prime importance, at the current and power levels of tunneling barriers, it is also important that the metal layers be very clean and free from contaminants. When fabricating the tunneling barrier by exposure to room ambient, it is difficult if not impossible to ensure the metal films have the desired purity to form stable STDs.

In a superconductive tunneling device, an important parameter is the value at which the current tunneling through the barrier switches from the zero voltage current to the quasiparticle regime which produces a voltage across the barrier. Tunneling barriers prepared in accordance with previous techniques frequently exhibited an increase or decrease in the zero voltage current after repeated switching at voltages which create fields on the order of $10^4$ to $10^6$ volts per centimeter across the barrier. These fields appear to initiate ion migration or dipole flipping when ions or dipoles are present, or can be generated in the barrier layer. Thus, the operation of a particular barrier was not necessarily reproducible between subsequent applications of electric fields across the barrier. Reproducibility and stability of STD characteristics are improved by the fabrication techniques of the present invention.

In accordance with the present invention, a tunneling barrier may be fabricated in a vacuum chamber under a controlled atmosphere. The first metal film is deposited in the vacuum chamber at a low residual gas pressure (approximately $10^{-7}$ Torr) and then cleaned by irradiation with charged particles, such as argon or helium ions. After the cleaning process has been completed, the vacuum chamber is again evacuated to a low pressure (approximately $10^{-7}$ Torr) in order to purge the cleaning gases from the chamber. The cleaned metal film will then be charged to a negative potential with regard to the positive ions of a gas introduced into the chamber and ionized by an a.c. or d.c. glow discharge. This charging can be achieved either by an applied negative potential or by electrons from the plasma impinging on the metal film. A voltage impressed across a pair of electrodes positioned in the vacuum chamber adjacent the film produces the a.c. or d.c. glow discharge. Positive gas molecules ionized and accelerated by the electric field will bombard the surface of the metal film and produce an insulating layer. Part of the energy of the accelerated particles forms a densely packed structure which will not degrade at the thermal energy level of room temperature, and thus represents the desired stable insulating layer configuration. A second metal layer is evaporated onto the insulating layer after the plasma has been extinguished at the desired insulating layer thickness.

In addition to the initial cleaning step, the first metal film will be continually cleaned during the insulating layer formation by sputtering of the neutral metal atoms with energetic gas ions.

An object of the present invention is to provide a process for fabricating tunneling barriers having a stable insulating layer configuration. Another object of the present invention is to provide a process for fabricating tunneling barriers which, when employed in STD's and operated at cryogenic temperatures, exhibit reproducible current-voltage and magnetic field characteristics. A further object of this invention is to provide a process for fabricating tunneling barriers under controlled atmospheric conditions. Still another object of the present invention is to provide a process for fabricating a tunneling barrier on a clean metal film. An additional object of the present invention is to provide a fabrication process for a tunneling barrier in a controlled reaction.

A more complete understanding of the invention and its advantages will be apparent from the specification and claims and from the accompanying drawings illustrative of the invention.

Figure 5:
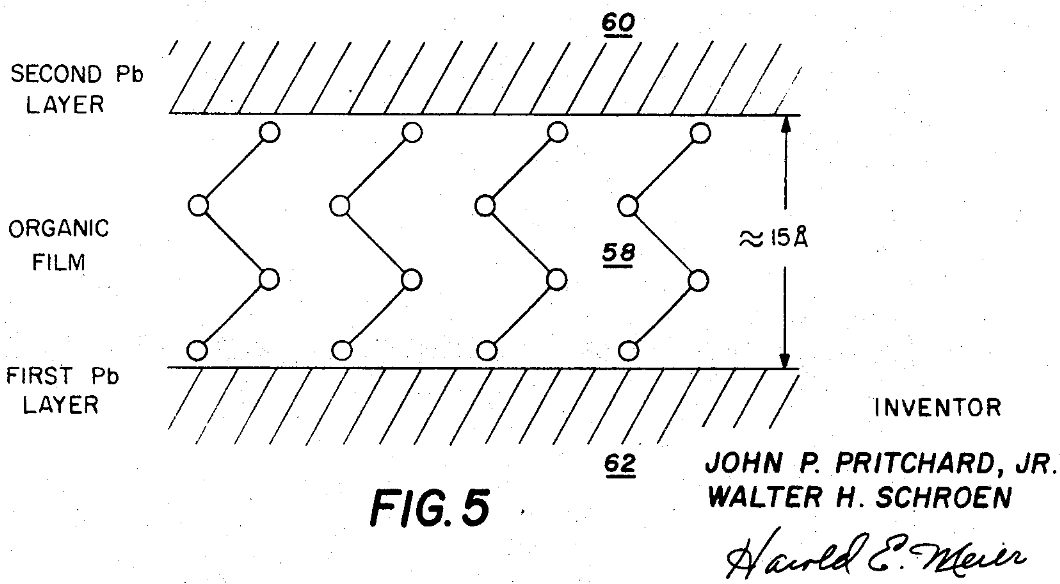

Referring to the drawings:

FIG. 1 is a schematic drawing of a system which may be used to carry out the process of the present invention;

FIGS. *2a* and *2b* illustrate a superconductive tunneling barrier produced in accordance with the present invention;

FIGS. *3a*, *3b*, and *3c* illustrate possible reactions of a process for continually cleaning the first metal layer and the formation of an adsorbed oxide barrier;

FIGS. *4a*, *4b*, *4c*, and *4d* illustrate possible reactions in an $O_2$ glow discharge for preparing an insulating barrier on a metal film; and FIG. 5 is a schematic cross-sectional model of a metal sandwich with organic molecules as the barrier material.

Referring to the drawings, there is shown in FIG. 1 a bell jar system 10 including a bell jar 12 in a sealing engagement with a base 14. The bell jar 12 may be evacuated through a pipe 18 by means of a vacuum system 16 of any suitable type, but should be capable of producing vacuums at least as low as $10^{-3}$ Torr, and preferably as low as $10^{-7}$ Torr, and include traps and filters for maintaining the bell jar atmosphere within set limits of purity. Any one of several gases may be introduced into the bell jar 12 through a manifold 20 as required for the various processing steps that will be described. A variable a. c. or d. c. high voltage source 22 connects to a pair of electrodes 24 and 26 to establish a glow discharge within the bell jar 12. Although illustrated as rods, these electrodes may take the shape of a screen or any other appropriate shape. For the process of the present invention, the a. c. or d. c. voltage source should be capable of generating voltages at least as high as 15,000 volts. A substrate 28 onto which a tunneling barrier will be formed is mounted in a holder 32 which is supported by suitable means (not shown) from the base plate 14.

In a preferred embodiment of the invention, the holder 32 is electrically insulated from the base plate 14. However, in a modification of this preferred embodiment, this holder is coupled to a voltage source (not shown) to charge the first lead film to a negative potential.

The supporting means including the holder 32 is mounted such that the substrate 28 may be readily moved from the position illustrated to a position over a chimney 34 which is part of an evaporation and condensation system for forming the first and second metal film on the substrate, as will be explained. In the usual manner, the chimney 34 contains one or more vessels of the metal to be deposited on the substrate 28 when in a position aligned with the opening of the chimney. The evaporated metals will propagate upwardly through the chimney and nucleate onto the surface of the substrate to form a film.

A thermocouple pressure gauge 36 is mounted within the bell jar 12 by means of a cable 38 passing through the base 14 for controlling the pressure within the bell jar 12. The cable 38 couples the gauge 36 to a control unit 40. The pressure gauge 36 includes a heat source and a temperature sensing element. Heating current is applied by way of conductor 42 to a heater element within the gauge 36. The heat transfer to the thermocouple element of the gauge 36 depends upon the pressure inside the bell jar 12, thus applying a pressure dependent signal to the control unit 40.

It will be understood that apparatus would be provided in the bell jar 12 to heat the substrate 28 and monitor the substrate temperature. Since such a system is well understood, it has not been shown to avoid undue complication of the drawing.

Figure 2A:
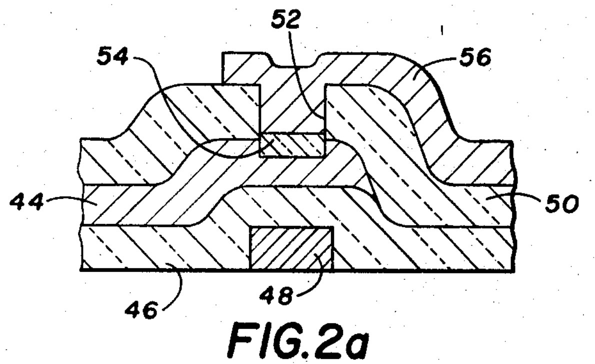
Figure 2B:
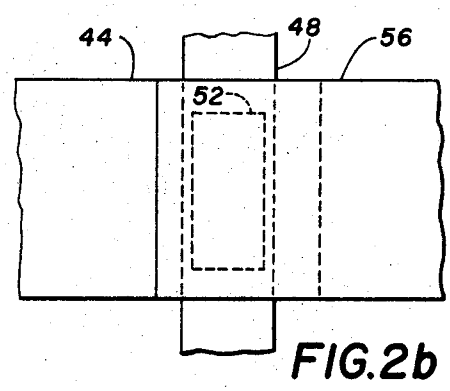

A suitable junction for the purposes of practicing the present invention is a lead-insulator-lead (Pb—$Pb_xO_y$—Pb) sandwich on a glass substrate as shown in FIGS. 2*a* and 2*b*. The cross-sectional view of FIG. 2*a* illustrates a first lead film 44 evaporated on an insulating layer 46 deposited on a carefully cleaned insulating substrate (not shown) over a control conductor 48. The control conductor 48 carries a control current which is used to decouple the phase coherence between the two wave functions of the superconducting electrons in the metal films 44 and 56 on either side of the tunneling barrier and thus to initiate the transition from supercurrent tunneling to quasi-particle tunneling. A second insulating layer 50 is deposited over the lead film 44 and a window 52 formed therein by a photoresist technique involving photomask and exposure and developing of the photoresist. The preparation continues with the polymerization of the photoresist and the cleaning of the metal surface in the window. A barrier layer 54 is either diffused into or deposited onto the lead film 44, as described in more detail below. Finally, a second lead film 56 is evaporated onto the insulating layer 50, through the window 52 and in contact with the barrier 54. The barrier is of appropriate thickness (10–15 Angstroms) to allow the tunneling of zero-voltage current.

In the article previously referred to, D. B. Josephson predicted a supercurrent (zero-voltage current) will flow across an energy barrier inserted between two superconductors. This supercurrent results from the nondissipative tunneling of electron pairs (Cooper-pairs) from one superconductor to the other through the barrier with no voltage drop across the junction provided the structure is maintained below the superconducting transition temperature $T_c$. For lead superconductors, the critical temperature is 7.2° K and the Josephson effect is readily observed at 4.2° K, the temperature of liquid helium.

After the insulating layer 50 has been formed over the entire substrate by an additional coat of photoresist, and the window 52 formed in the photoresist through which contact can be made with the lead film 44, the entire unit is placed in the bell jar 12 to irradiate or bombard the lead film 44 with ionized particles to thoroughly clean the exposed surface. This cleaning step is carried out with the substrate 28 in the position illustrated; with the lead film facing downwardly and the chamber evacuated in order to purge any undesirable gases. Then in accordance with the process described in the copending application of J. T. Pierce, et al., Ser. No. 415,845, filed Nov. 16, 1964 and assigned to the assignee of the present invention, the bell jar 12 is backfilled with a controlled atmosphere of an ionizing gas, such as argon or helium, to a pressure of about $10^{-3}$ Torr. An a. c. or d. c. voltage from the source 22 is impressed across the electrodes 24 and 26 such that gas particles ionized and accelerated by the electric field will bombard the surface of the lead film 44. Bombardment of the lead film 44 by the ionized particles removes chemical residues and other contaminants thereby thoroughly cleaning the metal surface.

After the exposed surface of the film has been thoroughly cleaned, all traces of the cleaning gas are removed by again evacuating the bell jar 12. The bell jar 12 is then backfilled to a pressure in the range of about $10^{-3}$ Torr with a gas for the diffusion of an insulating layer into the clean lead film 44. Preferably, the insulating layer is diffused into the lead film 44 by positive oxygen molecules although gases which have a tendency to form chemical compounds, and inert gases which are active in an ionized state, may be employed.

The temperature of the substrate 28 will be adjusted by means of a control unit, not shown in FIG. 1, to maintain a desired substrate temperature. A substrate temperature of about 80° C has been found to produce particularly favorable results.

An a. c. or d. c. voltage from the source 22 is again applied to the electrodes 24 and 26 until the dark portion of the glow created by the voltage envelopes the entire unit. The "turn-on" voltage, (i.e., the voltage at which the glow commences), depends on the pressure, geometry of the system, and the material of the substrate 28. A voltage between about 5,000 and 15,000 should produce desirable results; in one system, a voltage of 10,000 produced the desired a. c. glow discharge. As a result of the glow discharge, the gas within the bell jar 12 is ionized and the ionized particles are accelerated by the electromagnetic field created by the voltage connected to the electrodes 24 and 26.

Figures 3A, 3B, 3C:
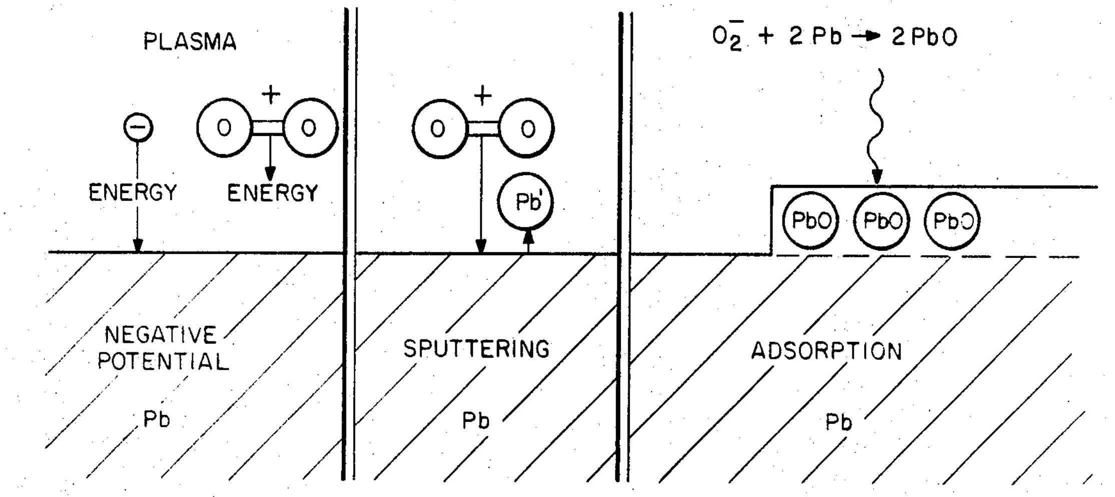
Figures 4A, 4B, 4C, 4D:
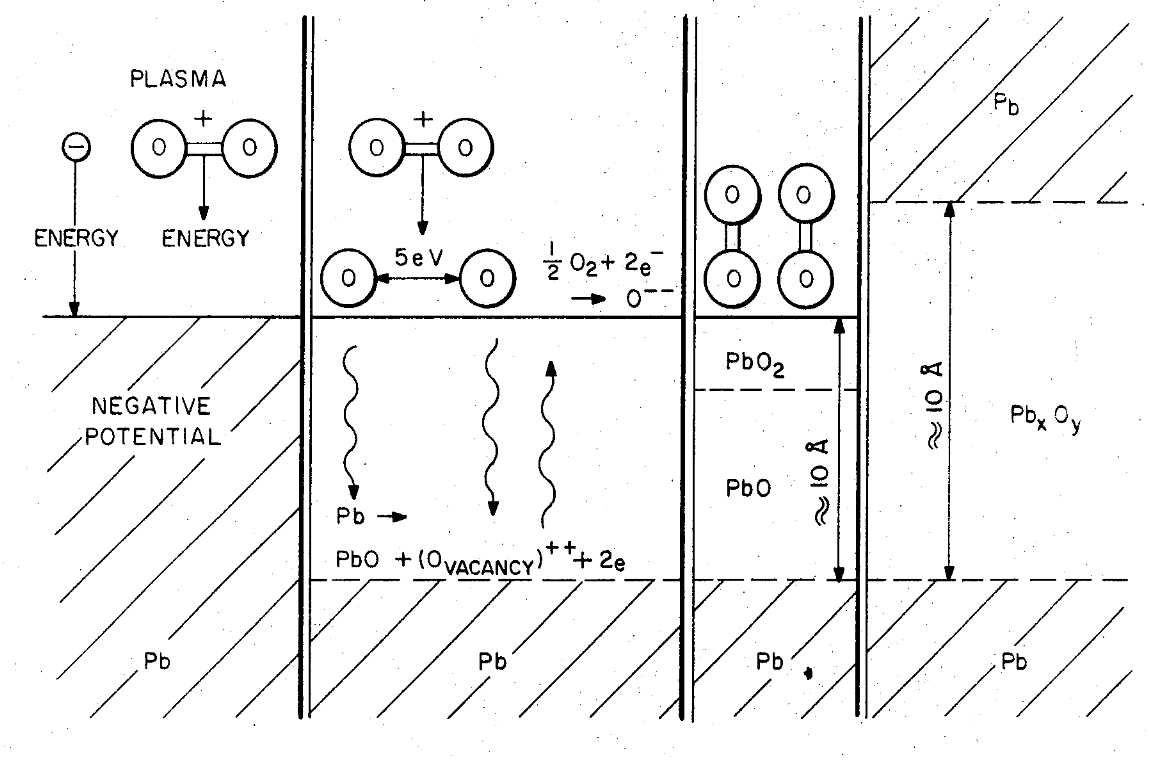

Referring to FIGS. 3 and 4, there are illustrated sketches of an oxidation process for forming an insulating layer in a lead film in an $O_2$ glow discharge. Initially, as illustrated in FIG. 4*a*, fast electrons from the plasma charge the Pb layer to a negative potential with regard to the positive ions of the reaction gas. However, as stated previously, the Pb layer may be maintained at a negative potential with regard to positive ions by means of an applied bias. In whatever manner, this negative potential helps attract positively charged oxygen molecules.

Actually, there are several processes being carried on simultaneously within the bell jar 12 during the formation of an insulating layer. As shown by the cross sectional views of FIGS. 3*a* and 3*b*, where the surface of the lead layer is drawn in a heavy black reference line, the neutral lead atoms are sputtered by energetic oxygen ions accelerated by the electromagnetic field within the jar. Since there are always slow electrons in the plasma which can become affixed to neutral oxygen molecules, the neutral lead atoms may find negatively charged oxygen molecules. Thus, the lead and oxygen reacts eagerly to form lead oxide which diffuses to the lead surface as illustrated in FIG. 3*b*. This sputtering process continually cleans the metal surface. Unsaturated metal bonds strongly absorb the lead oxide, thereby forming at least one monolayer of adsorbed lead oxide, as shown in the cross section of FIG. 3*c*.

FIGS. 4*a*, 4*b*, 4*c* and 4*d* illustrate in a simplified form the four steps of a probable oxidation process for forming a superconductive tunneling barrier employing an a. c. or d. c. oxygen glow discharge. As shown in FIG. 4*b*, the energy of impinging positive oxygen molecules performs two functions; first, they disassociate the oxygen molecules into two oxygen atoms, the disassociation energy being on the order of five electron volts; and second, part of the energy of the plasma particles may be used for the formation of a densely packed oxygen structure which does not appear to degrade and thus represents a desired stable metal oxide configuration.

The oxygen atoms acquire a double negative charge and begin to diffuse into the lead lattice where they readily form lead oxide of various compositions. While in the surface-near regions, the oxygen-rich compounds (e. g., $PbO_2$) may prevail, lead oxide (PbO) will dominate in the deeper lattice planes. As described in the literature, oxygen vacancies, in turn, diffuse from the lead-lead oxide interface toward the surface, thereby releasing the electron needed for the surface reaction.

After the oxide formation has reached the thickness of about 10–12 Angstroms, the plasma is extinguished by disconnecting the source 22 from the electrodes 24 and 26. The bell jar 12 will be again evacuated to remove the $O_2$ gas. During this operation, at least one monolayer of $O_2$ molecules is adsorbed immediately on the freshly formed oxide surface as illustrated in FIG. 4*c*.

It will be understood that nitrogen may be used instead of oxygen to sustain the glow discharge. Using nitrogen, an insulating metal nitride layer will be formed instead of the metal oxide layer described above. Organic vapors may also be employed to sustain the glow; these form an insulating organic film on the metal surface.

With the substrate 28 still in the bell jar 12, the second lead film 56 will be evaporated immediately upon completion of the oxide formation. The vacuum system 16 evacuates the bell jar 12 and the substrate 28 moved to a position (illustrated in dotted outline) over the chimney 34. Next, a source of lead disposed within the chimney 34 is heated to an evaporation temperature to cause the lead atoms to propagate upwardly and impinge on the lower surface of the substrate 28 whereupon the adsorbed $O_2$ molecules react with the first impinging Pb atoms and form an additional layer of lead-oxide. The substrate may then be removed from the bell jar 12 and portions of the second deposited film selectively removed by photoresist techniques to outline a desired conductor configuration.

Based on the above technique, tunneling barriers for STD's have been fabricated having characteristics which do not change during storage at room temperature or during repeated temperature cycling from room temperature to 4.2° K. Most barriers of a specific size showed an almost constant value for the maximum zero-voltage current. This value was independent of repetition rate and applied magnetic field in a particular test and from test-to-test.

High energy bombardment techniques, as described above for forming an oxide layer, may also be employed in the formation of barriers via large inorganic molecules, like lead nitride molecules on Pb metal, which are too big to diffuse through the Pb lattice. Tunneling barriers having a good stability can also be achieved by using an organic material consisting of molecules of appropriate length for the barrier preparation in an a. c. or d. c. glow discharge. Organic chains like monocarbonic acids ($C_nH_{2n}O_2$, $n = 5$–$10$) have also been found to form tunneling barriers by high energy bombardment. The main advantage of using these acids is that they can offer the correct spacing between the two metal films as required for a superconductive tunneling device.

In using the system illustrated in FIG. 1 for polymerization of large organic molecules in a glow discharge, the the vacuum system 16 evacuates the bell jar 12 to a pressure less than 10⁻Torr. Organic vapors are then introduced into the bell jar through the manifold 20 until the desired pressure rise has been attained. A voltage is applied to the electrodes 24 and 26 and the glow discharge commences and continues until the desired film thickness has been formed. Polymerization of the freshly formed film may also take place at this time. Referring to FIG. 5, there is shown schematically an organic film barrier 58 between two lead films 60 and 62.

While several embodiments of the invention, together with modifications, have been described in detail herein and shown in the accompanying drawings, it will be evident that various further modifications are possible without departing from the scope of the invention.

What is claimed is:

1. A process for the fabrication of a superconductive tunneling device comprising the steps of:

placing a first metal film in a vacuum chamber and evacuating the chamber to remove undesirable gases, backfilling the chamber to provide a very small pressure of noble gas, applying an ionizing voltage to a pair of spaced electrodes in the vacuum chamber, thereby bombarding said film with noble gas ions to provide a clean metal surface, then replacing the noble gas with a very small oxygen pressure, applying an A.C. voltage to said electrodes to ionize the oxygen and thereby bombard said cleaned surface with oxygen ions for a time sufficient to form a metal oxide film in the range of about 10 – 15 angstroms thick, then depositing a second metal film on said oxide film.

2. A process as defined by claim 1 wherein said first and second metal films are composed of lead.

3. A process as defined by claim 1 wherein said noble gas pressure is no greater than about $10^{-3}$ Torr.

4. A process as defined by claim 1 wherein said first ionizing voltage and said A.C. ionizing voltage are each in the range of 5,000 to 15,000 volts.

5. A process as defined by claim 1 wherein said oxygen pressure is in the range of about $10^{-3}$ Torr.

6. A process as defined by claim 1 including the further step of applying a negative potential to said first metal film during the application of ionizing voltage to said electrodes.

7. A process as defined by claim 1 wherein said first and second metal films are composed of tin.

8. A process for the fabrication of a superconductive tunneling device comprising the steps of:

placing a first metal film in a vacuum chamber and evacuating the chamber to remove undesirable gases, backfilling the chamber to provide a very small pressure of a first inert gas, applying a first ionizing voltage to a pair of spaced electrodes in the vacuum chamber, thereby bombarding said film with ions of said inert gas to provide a clean metal surface, then replacing the inert gas with a very small pressure of a second gas, the ions of which are capable of forming an insulating film on said first metal film, applying an A.C. ionizing voltage to said electrodes to ionize said second gas and thereby bombard the clean surface with ions of said second gas for a time sufficient to form an insulating film in the range of about 10 – 15 angstroms thick, then depositing a second metal film on said insulating film.

9. A process as defined by claim 8 wherein said second gas is nitrogen.

10. A process as defined by claim 8 wherein said second gas is a polymerizable organic vapor.

* * * * *